(12) United States Patent
Fang

(10) Patent No.: US 8,036,830 B2
(45) Date of Patent: Oct. 11, 2011

(54) RESISTIVITY IMAGER IN NON-CONDUCTIVE MUD FOR LWD AND WIRELINE APPLICATIONS

(75) Inventor: Sheng Fang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 673 days.

(21) Appl. No.: 12/128,907

(22) Filed: May 29, 2008

(65) Prior Publication Data

US 2009/0295392 A1    Dec. 3, 2009

(51) Int. Cl.
*G01V 3/18* (2006.01)
*G01V 3/00* (2006.01)

(52) U.S. Cl. ............... 702/11; 702/7; 324/333; 324/338

(58) Field of Classification Search ............ 702/7, 11; 324/333, 334, 338
See application file for complete search history.

(56) References Cited

U.S. PATENT DOCUMENTS

| | | |
|---|---|---|
| 3,808,520 A | 4/1974 | Runge |
| 3,882,374 A | 5/1975 | McDaniel |
| 3,973,181 A | 8/1976 | Calvert |
| 4,468,623 A | 8/1984 | Gianzero et al. |
| 4,780,678 A | 10/1988 | Kleinberg et al. |
| 5,200,705 A | 4/1993 | Clark et al. |
| 5,339,036 A | 8/1994 | Clark et al. |
| 6,903,553 B2 * | 6/2005 | Itskovich et al. ............ 324/339 |
| 6,957,708 B2 | 10/2005 | Chemali et al. |
| 7,073,609 B2 | 7/2006 | Tabanou et al. |
| 2004/0056663 A1 | 3/2004 | Sinclair et al. |
| 2005/0001624 A1 | 1/2005 | Ritter et al. |
| 2005/0218898 A1 | 10/2005 | Fredette et al. |
| 2006/0155471 A1 * | 7/2006 | Tabarovsky et al. ............ 702/6 |

* cited by examiner

*Primary Examiner* — Bryan Bui

(74) *Attorney, Agent, or Firm* — Mossman Kumar & Tyler PC

(57) ABSTRACT

An apparatus, method and computer-readable medium for imaging an earth formation. A downhole assembly having a resistivity sensor is conveyed in a borehole penetrating the earth formation. The resistivity sensor includes a plurality of antenna coils arranged along a radial line that is substantially perpendicular to a longitudinal axis of the downhole assembly and configured to obtain measurements of a resistivity property of the earth formation. A processor images the earth formation using the obtained measurements.

22 Claims, 11 Drawing Sheets

RESISTIVITY IMAGER IN NON-CONDUCTIVE MUD FOR LWD AND WIRELINE APPLICATIONS

BACKGROUND OF THE DISCLOSURE

1. Field of the Disclosure

The present disclosure is related to both logging-while-drilling (LWD) and wireline-logging (WL). In particular, the present disclosure is an apparatus and a method for imaging electrical properties surrounding a borehole having a non-conductive mud therein during or after the drilling.

2. Background of the Art

Electrical logging is well known and various devices and various techniques have been described for this purpose. Broadly speaking, there are two categories of devices used in electrical logging devices. In the first category, inject electrodes (current source or voltage source) are used in conjunction with receiver electrode(s) to measure either voltage difference between two electrodes or electric current that flows through a receiver electrode, earth formation to a return electrode in the tool. In the second category, an antenna (coils) with a current source within the measuring instrument induces eddy current within the earth formation. The induced current generates signals that can be detected using either the same antenna or a separate receiver antenna. The present disclosure belongs to the second category.

Techniques for investigating the earth formation with arrays of induction coils have been proposed. U.S. Pat. No. 6,957,708 to Chemali et al., assigned to Baker Hughes Incorporated, is a method and apparatus for determining an electrical property of a formation surrounding a borehole with a measuring-while drilling device. An antenna configuration is disposed along the outer face of an extendable stabilizer joined to a rotatable drill collar. Typically, two receivers and two transmitters are space along the longitudinal axis of the drill collar, with the two receivers spaced symmetrically in between the two transmitters. Alternatively, receivers and transmitters can be spaced along the circumference, possibly over multiple stabilizers.

U.S. Pat. No. 4,780,678 to Kleinberg et al., assigned to Schlumberger Technology Corporation, provides a wall-engaging apparatus for microinductively investigating a characteristic of an earth formation traversed by a borehole. In one aspect, an antenna set includes first, second and third antenna elements. The second and third elements, being structurally identical but differentially coupled, are positioned in electromagnetic symmetry about the first antenna element. Either the first antenna element or the differentially coupled second and third antenna elements may be energized by suitable circuits, while the other is coupled to circuits for receiving signals indicative of a set characteristic. As noted in U.S. Pat. No. 7,073,609 to Tabanou et al., having common ownership with Kleinberg and also assigned to Schlumberger Technology Corporation, the apparatus of Kleinberg et al. uses a differential induction coil system that responds primarily to contrast in resistivity between adjacent layers. As such, this tool has the capability to measure formation dip in oil-based mud, but it has no imaging capability.

U.S. Pat. No. 4,980,642 to Rodney is directed to a system, apparatus and methods for determining influx of formation fluids into a well borehole during drilling. The methods of Rodney include determining the dielectric constant and/or conductivity of the fluid in the annulus about a drill pipe in a well borehole, comparing the determined dielectric constant and/or conductivity to a reference value and inferring that influx has occurred when the difference between the dielectric constant and/or conductivity and the reference value is greater than a predetermined limit. The dielectric constant and/or conductivity is determined by transmitting electromagnetic energy between about 10 KHz and about 10 GHz through the fluid in the annulus about the drill pipe from a transmitter located in the drill pipe section, receiving a portion of that energy which has traveled through the fluid but not through the surrounding formation in a receiver located in the drill pipe, and determining the dielectric constant and/or conductivity as a function of at least one of the phase and the amplitude of the received energy.

Non-conductive mud is commonly used in wellbore drilling and its presence in the wellbore presents difficulties for wellbore imaging. The present disclosure addresses these issues.

SUMMARY OF THE DISCLOSURE

The present disclosure provides a method and apparatus for imaging earth formation. In one aspect, the disclosure provides an apparatus for imaging an earth formation that includes a downhole assembly configured to be conveyed in a borehole penetrating the earth formation; a resistivity sensor on the downhole assembly, the resistivity sensor including a plurality of antenna coils arranged along a radial line that is substantially perpendicular to a longitudinal axis of the downhole assembly and configured to obtain measurements of a resistivity property of the earth formation; and a processor configured to image the earth formation using the obtained measurements. The processor may further use a real part of the obtained measurements or a magnitude of the resistivity in order to image the formation. The downhole assembly may be a bottomhole assembly (BHA) conveyed on a drilling tubular, and the resistivity sensor is disposed on either a rotatable drill collar or a stabilizer of the BHA. In one aspect, the plurality of antenna coils includes two transmitter coils and a receiver coil between the two transmitter coils, the two transmitter coils and receiver coil being oriented along one of: i) a radial direction, ii) an azimuthal direction, and iii) an axial direction of the downhole assembly. The two transmitter coils have oppositely-oriented magnetic moments. The receiver coil is disposed between the two transmitter coils at a position of a minimum voltage reading in air. In another aspect, the plurality of antenna coils includes a transmitter coil and a receiver coil oriented orthogonally to the transmitter coil. The antenna coils are operated at a higher frequency to obtain a measurement of formation dielectric constant or at a lower frequency to obtain a measurement of formation resistivity. The antenna coils may be configured to compensate for direct coupling, using for example: adjusting a spacing of the antenna coils, selecting a number of turns of the antenna coils, adjusting a size of the antenna coils, adjusting a gain of the antenna coils, or implementing a software process of numerical calibration. In one aspect, magnetic materials may be used to control a direction of magnetic flux and enhance a signal level.

The present disclosure provides a method of imaging an earth formation, which includes conveying a downhole assembly in a borehole penetrating the earth formation; obtaining measurements of a resistivity property of the earth formation using a resistivity sensor on the downhole assembly, the resistivity sensor including a plurality of antenna coils arranged along a radial line that is substantially perpendicular to a longitudinal axis of the downhole assembly; using a processor to image the earth formation from the obtained measurements; and storing the image to a suitable storage medium. The method further includes using the processor to image the formation using a real part of the obtained measurements or a magnitude of the resistivity. Magnetic materials may be used to control a direction of magnetic flux and enhance a signal level. In one aspect, conveying the downhole assembly includes conveying a bottomhole assembly (BHA) on a drilling tubular and wherein the resistivity sensor is disposed on one of: i) a rotatable drill collar, and ii) a stabilizer of the BHA. In one aspect, the plurality of antenna coils includes two transmitter coils and at least a receiver coil between the two transmitter coils, the two transmitter coils and receiver coil being oriented along one of: i) a radial direction, ii) an azimuthal direction, and iii) an axial direction of the downhole assembly. The magnetic moments of the two transmitter coils are oriented in opposite directions. The receiver coil is disposed between the transmitter coils at a position of a minimum voltage reading in air. In another aspect, the plurality of antenna coils includes a transmitter coil and a receiver coil oriented orthogonally to the transmitter coil. Measurements may be obtained by operating the plurality of antenna coils at a higher frequency to obtain a measurement of formation dielectric constant or at a lower frequency to obtain a measurement of formation resistivity. The antenna coils may be configured to compensate for direct coupling, using for example: adjusting a spacing of the antenna coils, selecting a number of turns of the antenna coils, adjusting a size of the antenna coils, adjusting a gain of the antenna coils, and implementing a software process of numerical calibration.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
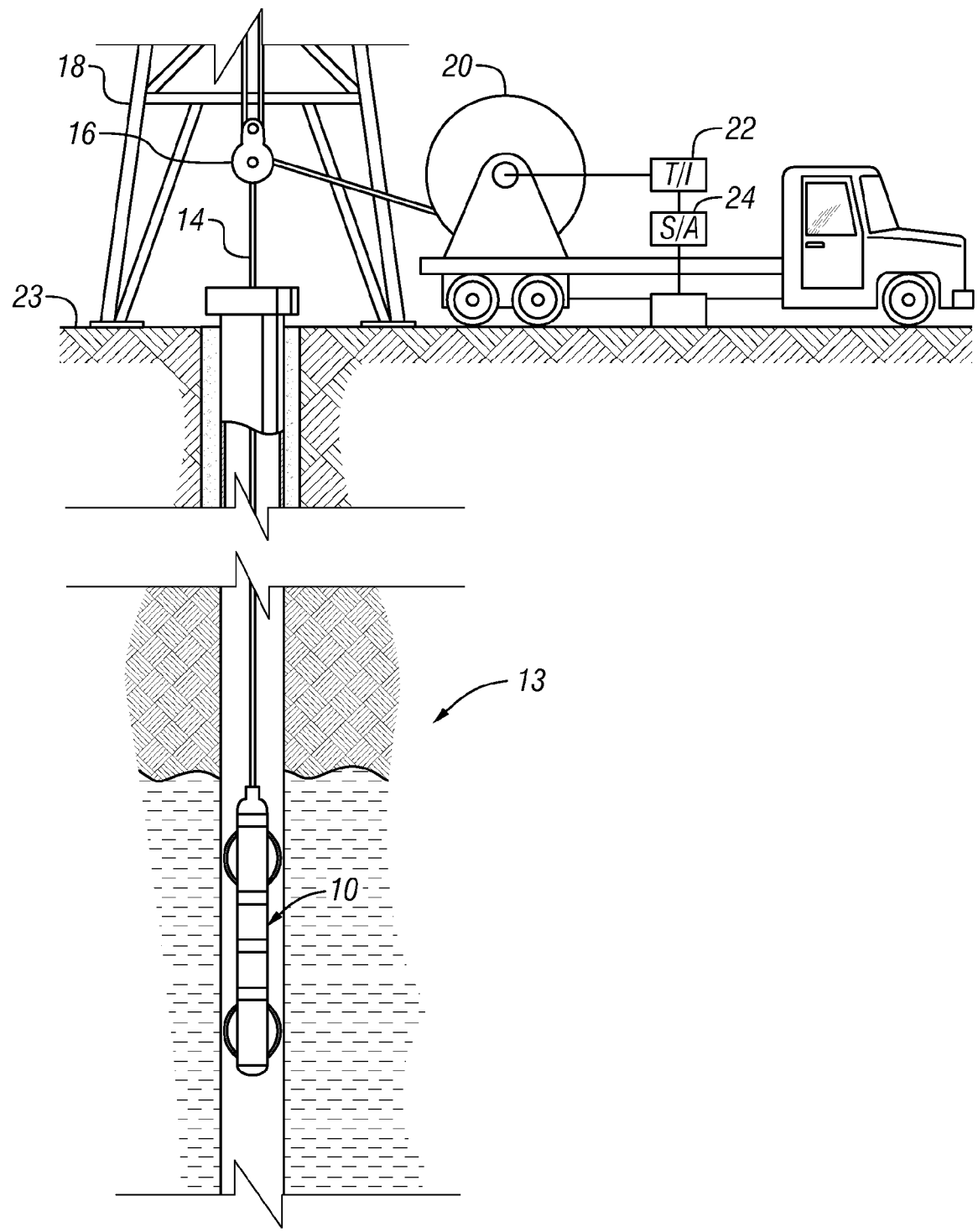
FIG. 1 (Prior Art) shows an exemplary logging tool suspended in a borehole.

FIG. 1 shows an imaging tool 10 suspended in a borehole 12, that penetrates earth formations such as 13, from a suitable cable 14 that passes over a sheave 16 mounted on drilling rig 18. The cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. The data processor may be at the surface or provided downhole.

Figure 2:
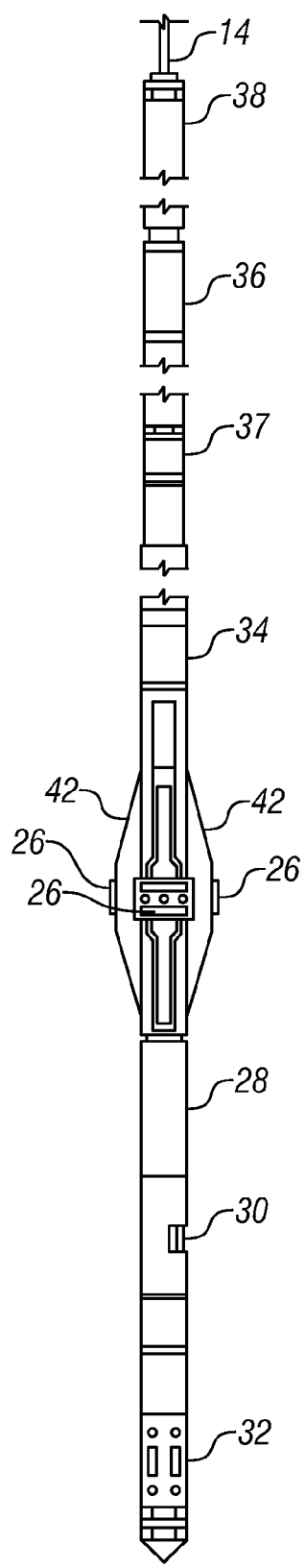
FIG. 2 (Prior Art) is a mechanical schematic view of an exemplary imaging tool.

FIG. 2 is a schematic external view of a borehole sidewall imager system. The tool 10 including the imager system includes resistivity arrays 26. Optionally, the imager system may include other sensors, such as a mud cell 30 or a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly may be about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22. Also shown in FIG. 2 are three resistivity arrays 26 (a fourth array is hidden in this view.

The present disclosure provides a method and apparatus for imaging a formation surrounding a borehole in which non-conductive mud is used during drilling. The apparatus provides an antenna configuration for measuring resistivity properties of the formation such as resistivity and dielectric constant. The antenna configuration may be manufactured on an extendable stabilizer or a rotatable drill collar or pads (with multiple antennas) for a wireline tool. In such an antenna configuration, two or three antenna coils are arranged along a radial line perpendicular to the longitudinal axis of the wireline tool. The coils may be oriented at arbitrary angles. Typically, the coils may be either co-axial, or co-planar, or orthogonal. The multiple coils are usable to compensate for the common modes of signals, such as direct coupling. The compensation may be implemented by either a hardware arrangement or a software process of numerical calibration. In a hardware arrangement with two transmitter loops, the two transmitter loops are oriented to have opposing magnetic moments. Exemplary hardware arrangements for providing compensation may be attained by: adjusting coil spacings, selecting the number of turns, adjusting the size of coils, and adjusting the gains to provide proper amounts of current in the two transmitters, among other possibilities. In the implementation, both bucking (subtraction) and differential (ratio) measurements may be used. The receiver may be slightly offset relative to radial axis due to non-symmetrical configurations.

The present disclosure is distinguishable from Kleinberg '678 at least by the reverse use of transmitter and receiver. In Kleinberg '678, the transmitter is a single loop, whereas in the present disclosure, the transmitter is two loops. With the same amount of current in the transmitters, the measurements are equivalent under the principle of reciprocity. However, with the same amount of power supply, they are not equivalent under the principle of reciprocity. Instead, the eddy current produced in the surrounding metal is different. The design of the present disclosure generates less eddy currents in the metal than the design of Kleinberg '678. This enables obtaining high quality measurements and enables the design of the present disclosure to image borehole surrounding formation characteristics.

In an additional aspect, magnetic materials can be filled to control the direction of magnetic flux and enhance the signal level. A range of frequencies can be selected (from tens of MHz to a few GHz). When higher frequency is used, the obtained measurements will be dominated by the effects of formation dielectric constant; otherwise, they will be dominated by the effects of formation resistivity.

Figure 3A:
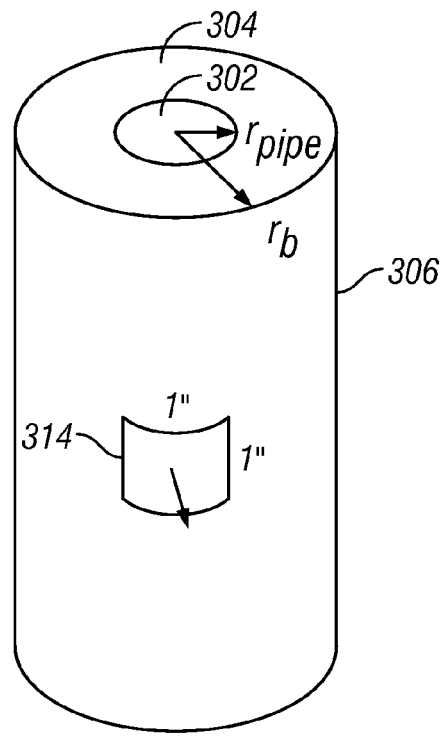
FIG. 3 shows one aspect of the present disclosure for measuring an electrical property of the formation using radially-oriented antenna coils.
Figure 3B:
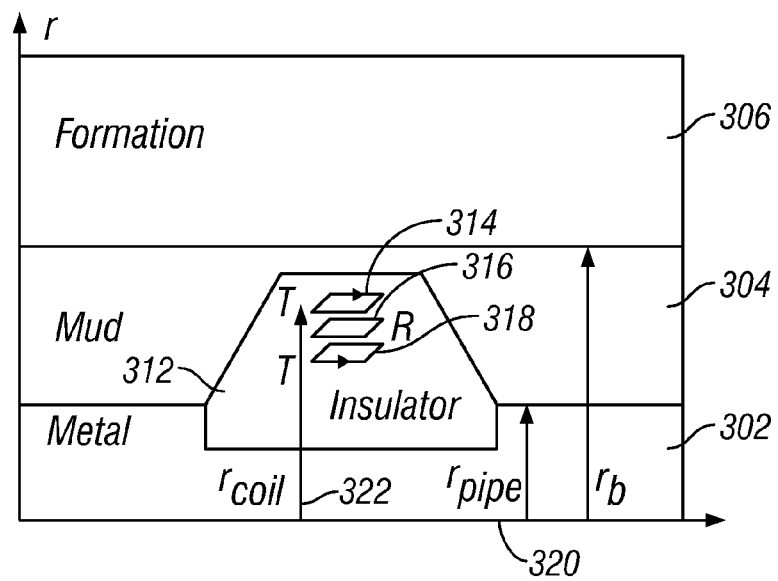
Figure 4A:
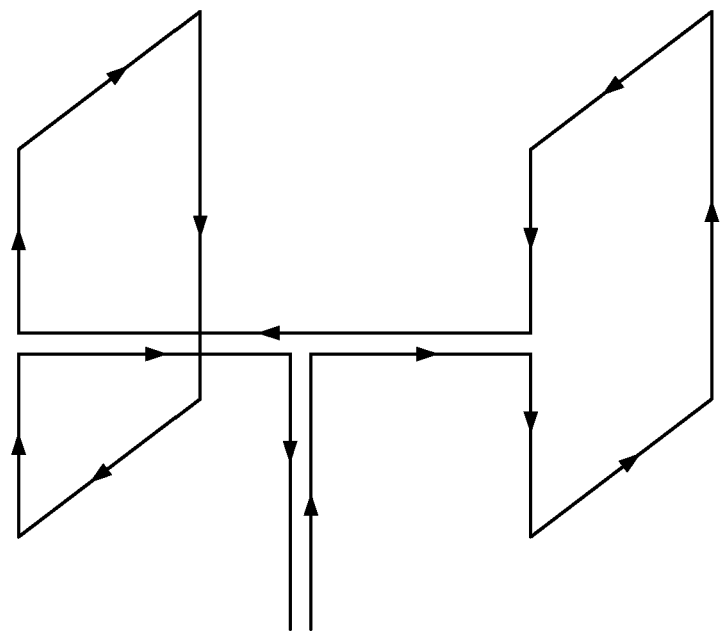
FIG. 4 shows alternative configurations for transmitter coils used in the present disclosure.
Figure 4B:
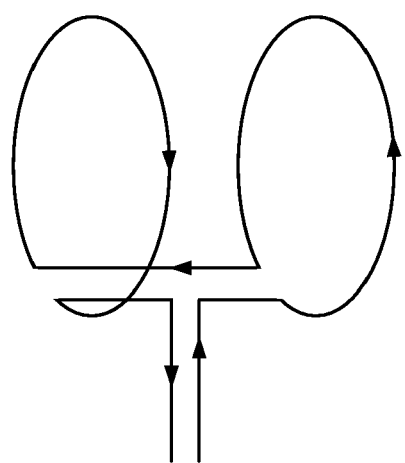

FIG. 3 shows one aspect of the present disclosure for measuring an electrical property of the formation having radially-oriented antenna coils. Logging-while-drilling (LWD) tool 302 is placed in a borehole penetrating the formation 306, the borehole being filled with a non-conducting mud 304. The LWD tool has an extendable pad 312, which may be, for example, an extendable stabilizer of the LWD tool or a rotating drill collar. FIG. 3B shows a plurality of antenna coils disposed in the extendable pad. The antenna coils are arranged along a radial line 322 that is perpendicular to the longitudinal axis 320 of the LWD tool. In one aspect, the plurality of antenna coils includes two transmitter coils 314, 318 placed on either side of a receiver coil 316. In the example of FIG. 3, the antenna coils are placed with their magnetic moments oriented along the radial line on which they are arranged. The receiver coil is disposed in between and is adjusted in position to yield a possible minimum voltage reading (close to zero) in the air. FIG. 3A shows the orientation of antenna coil 314 as seen from an exterior viewpoint. In an aspect of the present disclosure, the transmitter coils 314, 318 have magnetic moments that are oriented in opposite directions. This is achieved by having the current in one transmitter coil flowing in the opposite direction as the current in the other transmitter coil. In one aspect, current may be supplied to the two transmitter coils using two separate current sources. Alternatively, the two transmitter coils may be two loops made formed using a single wire which is connected to a single current source, the loops being arranged so that current flowing in opposite directions in each of the loops, as shown in FIG. 4. The configuration of FIG. 4 results in oppositely-oriented magnetic moments. The loops may be of any arbitrary shape, including rectangular (FIG. 4A) and circular (FIG. 4B).

Figure 5A:
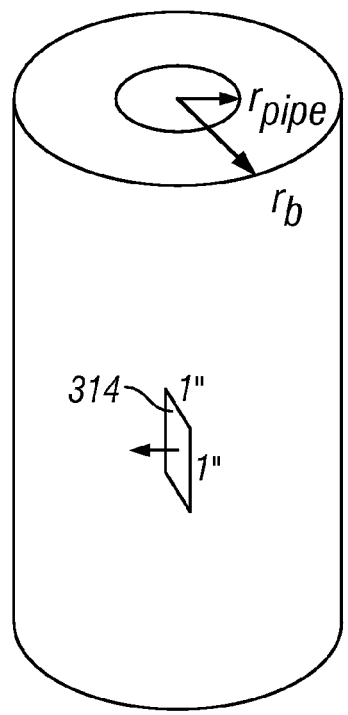
FIG. 5 shows azimuthally oriented-antenna coils for measuring an electrical property of the formation.
Figure 5B:
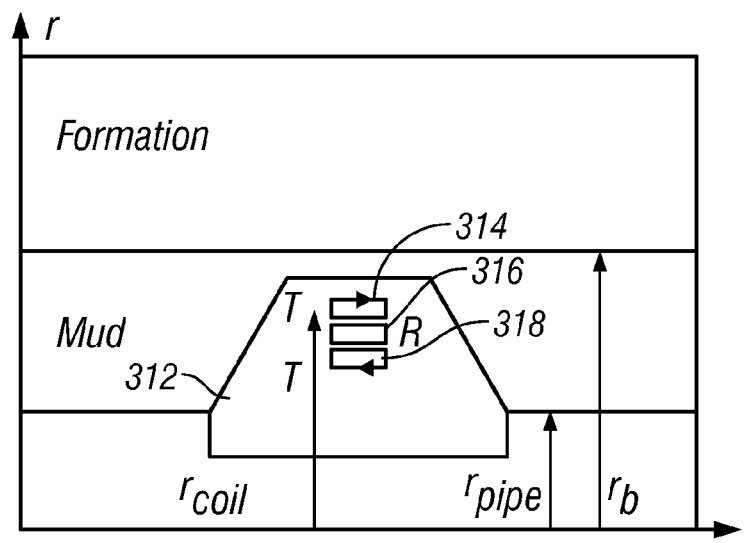

FIG. 5 shows azimuthally oriented-antenna coils for measuring an electrical property of the formation. FIG. 5B shows a plurality of antenna coils disposed on extendable pad 312 and arranged along a radial line that is perpendicular to the longitudinal axis of the LWD tool, as in FIG. 3. The plurality of antenna coils includes two transmitter coils 314, 318 placed on either side of a receiver coil 316. In the example of FIG. 5, the antenna coils are placed with their magnetic moments oriented along the azimuthal direction of the LWD tool. The magnetic moments of the transmitter coils are oppositely oriented. FIG. 5A shows the azimuthal orientation of antenna coil 314 as seen from an exterior viewpoint.

Figure 6A:
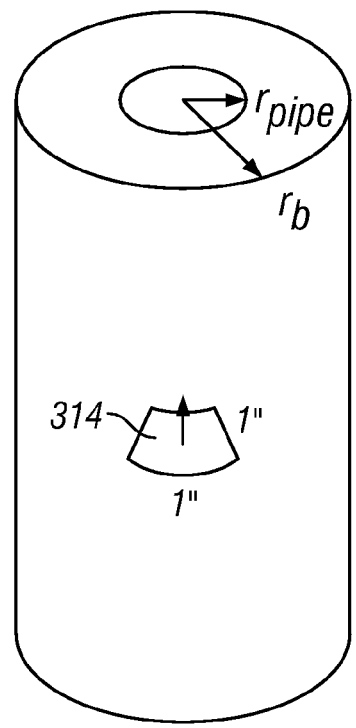
FIG. 6 shows axially oriented antenna coils for measuring an electrical property of the formation.
Figure 6B:
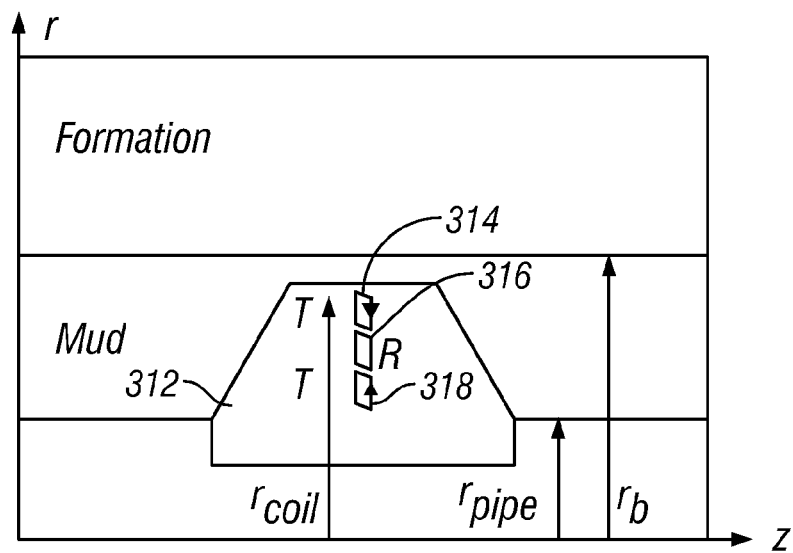

FIG. 6 shows axially oriented antenna coils for determining an electrical property of a formation. FIG. 6B shows a plurality of antenna coils disposed on extendable pad 312. The antenna coils are arranged along a radial line that is perpendicular to the longitudinal axis of the LWD tool, as in FIG. 3. The plurality of antenna coils includes two transmitter coils 314, 318 placed on either side of a receiver coil 316. In the example of FIG. 6, the antenna coils are placed with their magnetic moments oriented along the axial direction of the LWD tool. The magnetic moments of the transmitter coils are oppositely oriented. FIG. 6A shows the axial orientation of antenna coil 314 as seen from an exterior viewpoint.

Figure 7A:
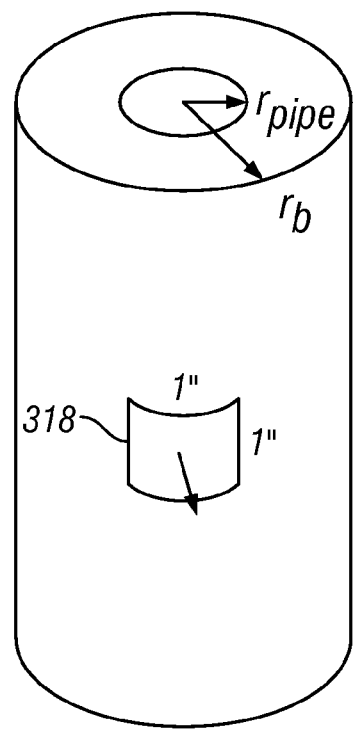
FIG. 7 shows an exemplary orthogonal two-loop resistivity sensor for measuring an electrical property of the formation.
Figure 7B:
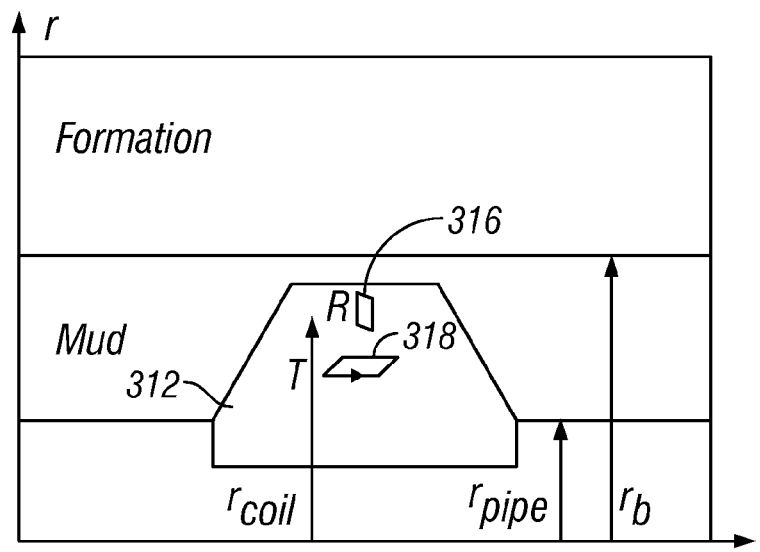

FIG. 7 shows an exemplary orthogonal two-loop resistivity sensor for measuring an electrical property of the formation. FIG. 5B shows the antenna coils arranged on extendable pad 312 along a radial line that is perpendicular to the longitudinal axis of the LWD tool, as in FIG. 3. The antenna coils include a single transmitter coil 318 and a receiver coil 316. When two coils are used, they will be orthogonal to each other. Hence, the magnetic moment of the receiver coil 316 is oriented orthogonally to the magnetic moment of the transmitter coil 318. FIG. 7A shows the radial orientation of transmitter coil 318 as seen from an exterior viewpoint.

As seen in FIGS. 3 and 5-7, multiple antenna configurations can be mounted on pads for wireline applications. The hardcover of the pads guarantees a minimum stand-off for the antenna coils of the resistivity sensor. This stand-off is optional for a co-axial configuration of coils.

Figure 8:
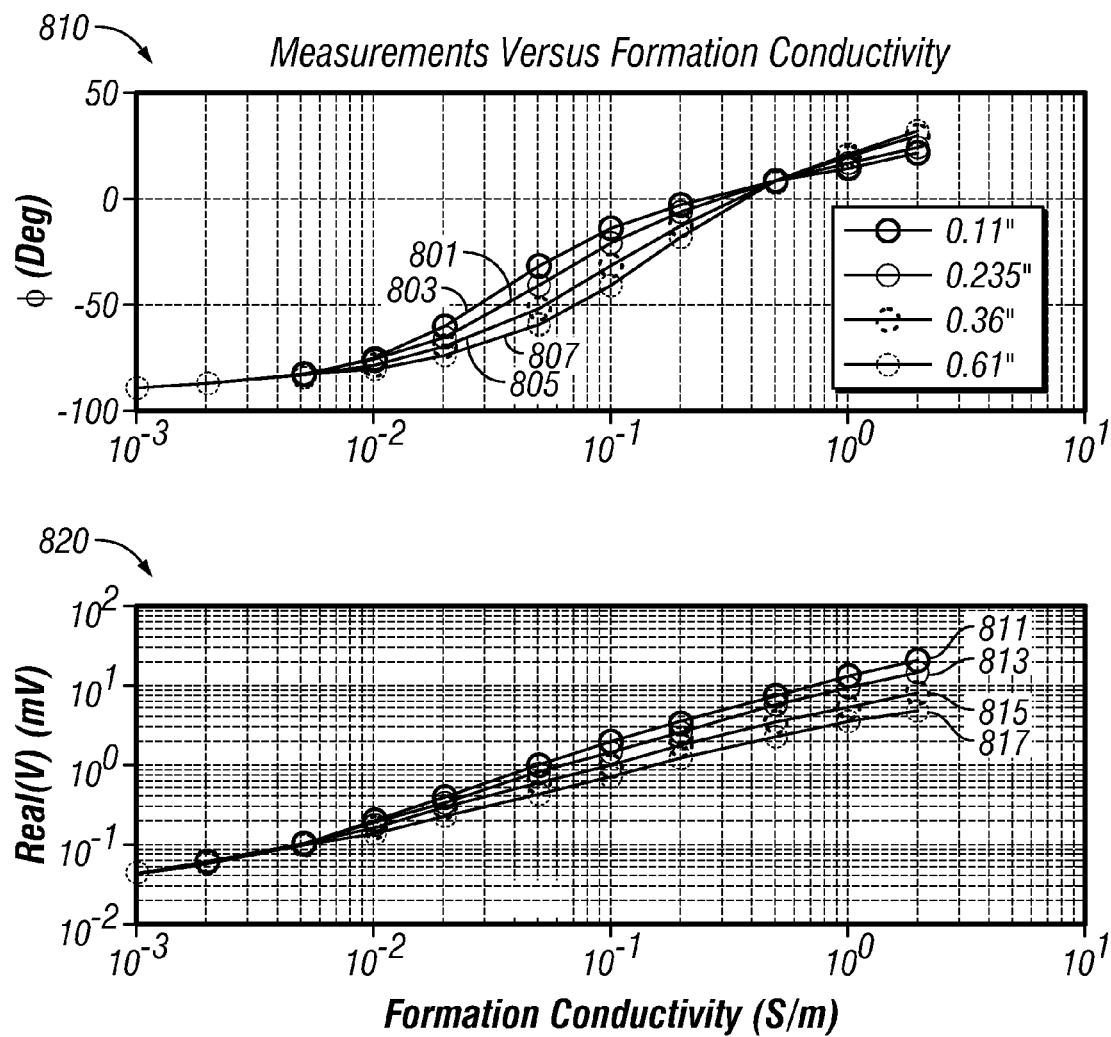
FIGS. 8-9 show measurements obtained at several standoff values of the resistivity sensor.
Figure 9:
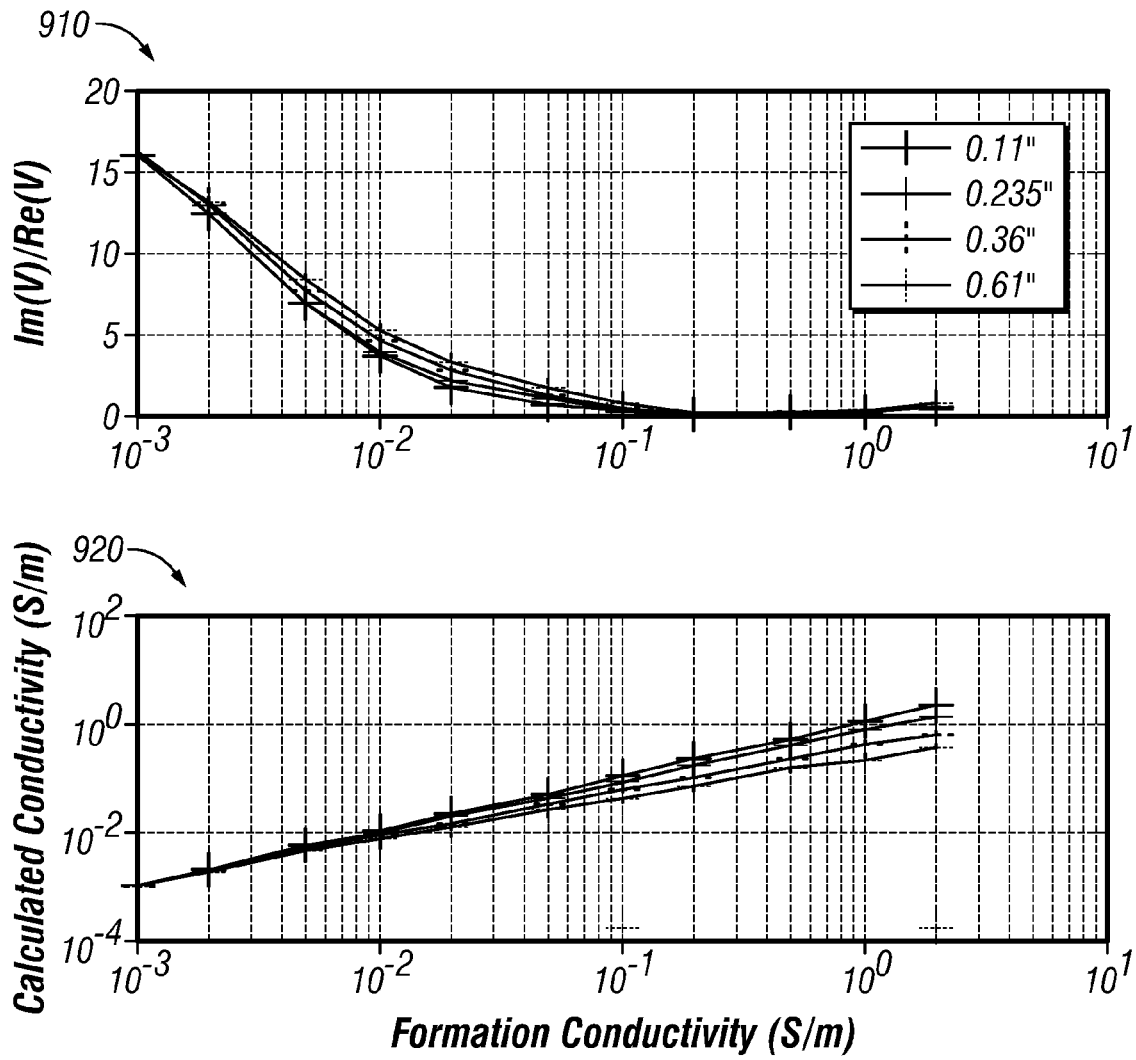

FIG. 8 shows measurements obtained at several standoff values of the resistivity sensor. Graph 810 shows a measurement of the ratio of the imaginary component to the real component of the obtained at various formation conductivities. Measurements shown are obtained at a standoff of 0.11 inches (801), 0.235 inches (803), 0.36 inches (805), and 0.61 inches (807). Graph 820 shows the real part of a measurement signal obtained at various formation conductivities. Measurements shown are obtained at a standoff of 0.11 inches (811), 0.235 inches (813), 0.36 inches (815), and 0.61 inches (817). Graph 820 shows that there is a linear relationship between the formation conductivity and the obtained real part of the signal measurements. In FIG. 9, Graph 910 shows a ratio of imaginary part of the signal over real part of the signal. Graph 920 shows a calculated apparent conductivity obtained from the real part of the signal. Graph 920 shows a linear relationship between the formation conductivity and the calculated conductivity of the signal. From FIGS. 8-9, an operator may observe that ¼-inch standoff is usable for measurement purposes.

Figure 10:
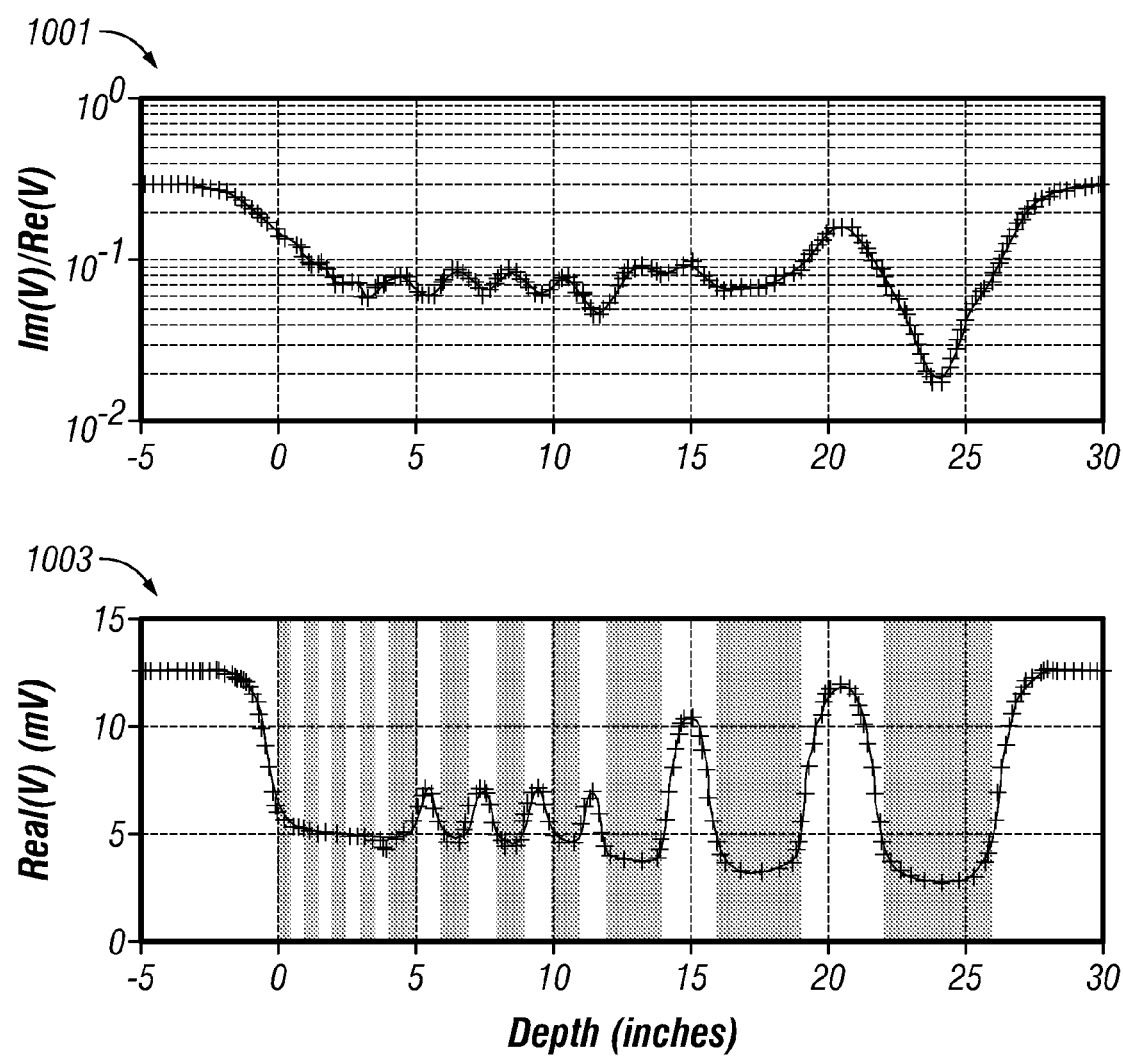
FIGS. 10-11 show electrical measurements obtained from an exemplary formation bed model.
Figure 11:
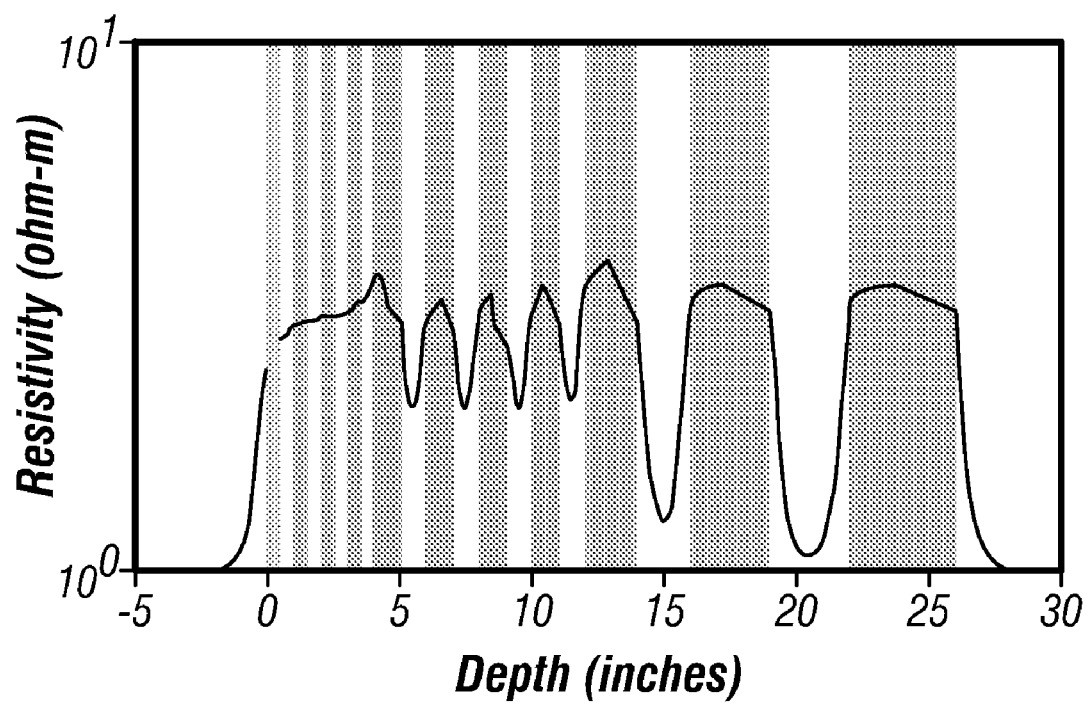

FIGS. 10-11 show electrical measurements obtained from an exemplary formation bed model. The formation model includes bed layers having various thicknesses. The minimum thickness of a bed in FIGS. 10-11 is 0.5 inch. Graph 1001 of FIG. 10 shows a ratio of an imaginary part of a signal to a real part of the signal over the formation model. Graph 1003 of FIG. 10 shows the real part of the signal obtained over the exemplary formation model. The ratio of the imaginary part of the signal over the real part of the signal (Graph 1001) and the real part of the signal (Graph 1003) are calculated for a model of multi-layers with different thicknesses (from 0.5 inches to 4 inches). This formation model is also shown in Graph 1003. The resistivities are 1 Ω-m for background and 10 Ω-m for layers. FIG. 11 shows a measurement of apparent resistivity vs. depth for the multi-layer formation model. The apparent resistivity is calculated for a model of multi-layers with different thickness (from 0.5 inches to 4 inches). The resistivities are 1 Ω-m for background and 10 Ω-m for layers. Measurements are obtained for the presence of oil-based mud and using a ⅛-inch antenna stand-off. It can be seen from FIGS. 10-11 that the tool achieves a good resolution for 1-inch layers of the formation model.

Figure 12:
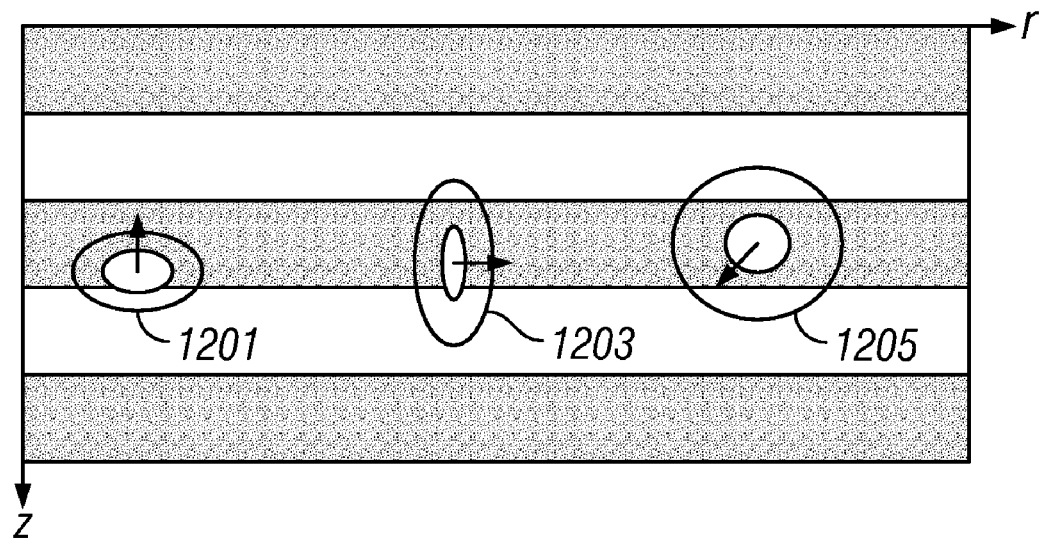
FIG. 12 shows eddy currents from orthogonal coils in a thin bed formation.

FIG. 12 shows eddy currents from orthogonal coils in a thin bed formation. Eddy current 1201 is produced using z-oriented transmitter coils; eddy current 1203 is produced using radially-oriented transmitter coils; and Eddy current 1201 is produced using azimuthally-oriented transmitter coils. In turn, eddy current 1201 produces a z-oriented magnetic field; eddy current 1203 produces a radially-oriented magnetic field; and eddy current 1205 produces an azimuthally-oriented magnetic field. Eddy currents 1203 and 1205 cross the nearby boundaries while eddy current 1201 does not. The resolution of the apparatus is reduced when the eddy currents cross a boundary. The vertical resolution is higher for a co-planar z-coils configuration (1201) but the azimuth resolution is lower. Oppositely, the azimuth resolution will be higher for a co-planar Φ-coils configuration but the vertical resolution will be lower. The preferred co-axial configuration has approximately equal resolutions in both directions.

It will be appreciated by those skilled in the art that resistivity is the inverse of conductivity. Accordingly, any reference in this disclosure to resistivity should be considered to include disclosure as to conductivity inverted. Similarly, any reference in this disclosure to conductivity should be considered to include disclosure as to the resistivity inverted.

The disclosure has further been described by reference to logging tools that are intended to be conveyed on a wireline. However, the method of the present disclosure may also be used with measurement-while-drilling (MWD) tools, or logging while drilling (LWD) tools, either of which may be conveyed on a drillstring or on coiled tubing. Further, the disclosure may be adapted to be conveyed on a slickline, as will be evident to one skilled in the art. An example of a resistivity imaging tool for MWD use is disclosed in U.S. Pat. No. 6,600,321 to Evans, having the same assignee as the present disclosure, the contents of which are incorporated herein by reference. For the purposes of this disclosure, the logging string conveyed on a wireline and a bottomhole assembly conveyed on a drilling tubular may be referred to as downhole assemblies.

The processing of the data may be done with the use of a computer program implemented on a suitable computer-readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole with the remainder conducted at the surface.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. An apparatus for imaging an earth formation, the apparatus comprising:
   a downhole assembly configured to be conveyed in a borehole penetrating the earth formation;
   a resistivity sensor on the downhole assembly, the resistivity sensor including a plurality of antenna coils arranged along a radial line that is substantially perpendicular to a longitudinal axis of the downhole assembly and configured to obtain measurements of a resistivity property of the earth formation; and
   a processor configured to image the earth formation using at least one of: (i) a real part of the obtained measurements, or (ii) a magnitude of the obtained measurements.

2. The apparatus of claim 1, wherein the downhole assembly further comprises a bottomhole assembly (BHA) conveyed on a drilling tubular and wherein the resistivity sensor is disposed on one of: i) a rotatable drill collar, and ii) a stabilizer of the BHA.

3. The apparatus of claim 1, wherein the plurality of antenna coils further comprises two transmitter coils and a receiver coil between the two transmitter coils, the two transmitter coils and receiver coil being oriented along one of: i) a radial direction, ii) an azimuthal direction, and iii) an axial direction of the downhole assembly.

4. The apparatus of claim 3, wherein the two transmitter coils are configured to have oppositely-oriented magnetic moments.

5. The apparatus of claim 3, wherein the receiver coil is disposed between the two transmitter coils at a position of a minimum voltage reading in air.

6. The apparatus of claim 1, wherein the plurality of antenna coils further comprises a transmitter coil and a receiver coil oriented orthogonally to the transmitter coil.

7. The apparatus of claim 1 further comprising magnetic materials configured to control a direction of magnetic flux and enhance a signal level.

8. The apparatus of claim 1, wherein the plurality of antenna coils are configured to operate at one of: i) higher frequency to obtain a measurement of formation dielectric constant, and ii) lower frequency to obtain a measurement of formation resistivity.

9. The apparatus of claim 1, wherein the plurality of antenna coils are configured to compensate for direct coupling.

10. The apparatus of claim 9, wherein compensating for direct coupling includes at least one of: i) adjusting a spacing of the antenna coils, ii) selecting a number of turns of the antenna coils, iii) adjusting a size of the antenna coils, iv) adjusting a gain of the antenna coils, and v) implementing a software process of numerical calibration.

11. A method of imaging an earth formation, comprising:
    conveying a downhole assembly in a borehole penetrating the earth formation;
    obtaining measurements of a resistivity property of the earth formation using a resistivity sensor on the downhole assembly, the resistivity sensor including a plurality of antenna coils arranged along a radial line that is substantially perpendicular to a longitudinal axis of the downhole assembly; and
    using a processor to image the earth formation from at least one of: (i) a real part of the obtained measurements, or (ii) a magnitude of the obtained measurements.

12. The method of claim 11, wherein conveying the downhole assembly further comprises conveying a bottomhole assembly (BHA) on a drilling tubular and wherein the resistivity sensor is disposed on one of: i) a rotatable drill collar, and ii) a stabilizer of the BHA.

13. The method of claim 11, wherein the plurality of antenna coils further comprises two transmitter coils and a receiver coil between the two transmitter coils, the two transmitter coils and receiver coil being oriented along one of: i) a radial direction, ii) an azimuthal direction, and iii) an axial direction of the downhole assembly.

14. The method of claim 13, wherein the magnetic moments of the two transmitter coils are oriented in opposite directions.

15. The method of claim 13, wherein the receiver coil is disposed between the transmitter coils at a position of a minimum voltage reading in air.

16. The method of claim 11, wherein the plurality of antenna coils further comprises a transmitter coil and a receiver coil oriented orthogonally to the transmitter coil.

17. The method of claim 11 further comprising using magnetic materials to control a direction of magnetic flux and enhance a signal level.

18. The method of claim 11, wherein obtaining measurements further comprises operating the plurality of antenna coils at one of: i) higher frequency to obtain a measurement of formation dielectric constant, and ii) lower frequency to obtain a measurement of formation resistivity.

19. The method of claim 11, further comprising configuring the plurality of antenna coils to compensate for direct coupling.

20. The method of claim 19, wherein compensating for direct coupling includes at least one of: i) adjusting a spacing of the antenna coils, ii) selecting a number of turns of the antenna coils, iii) adjusting a size of the antenna coils, iv) adjusting a gain of the antenna coils, and v) implementing a software process of numerical calibration.

21. A non-transitory computer-readable medium product having instructions thereon that when read by a processor cause the processor to execute a method, the method comprising:
 imaging an earth formation using at least one of: (i) a real part of measurements obtained by a resistivity sensor on a downhole assembly, the resistivity sensor including a plurality of antenna coils arranged along a radial line that is substantially perpendicular to a longitudinal axis of the downhole assembly, or (ii) a magnitude of the measurements obtained by the resistivity sensor.

22. The non-transitory computer-readable medium product of claim 21 further comprising at least one of (i) a ROM, (ii) and EPROM, (iii) an EEPROM, (iv) a flash memory, and (v) an optical disk.

* * * * *